Oct. 19, 1971 NORIO TAKADA 3,613,205
METHOD OF MAKING A FRAME ASSEMBLY OF AN ENDLESS-BELT
TRACTION MIDGET SNOW VEHICLE
Filed March 25, 1969 2 Sheets-Sheet 1
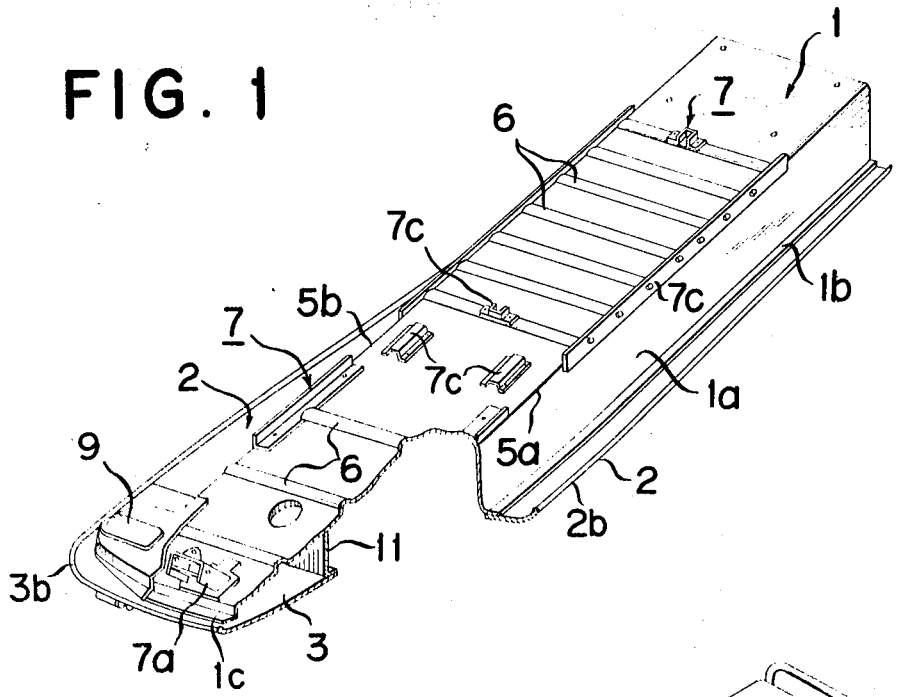
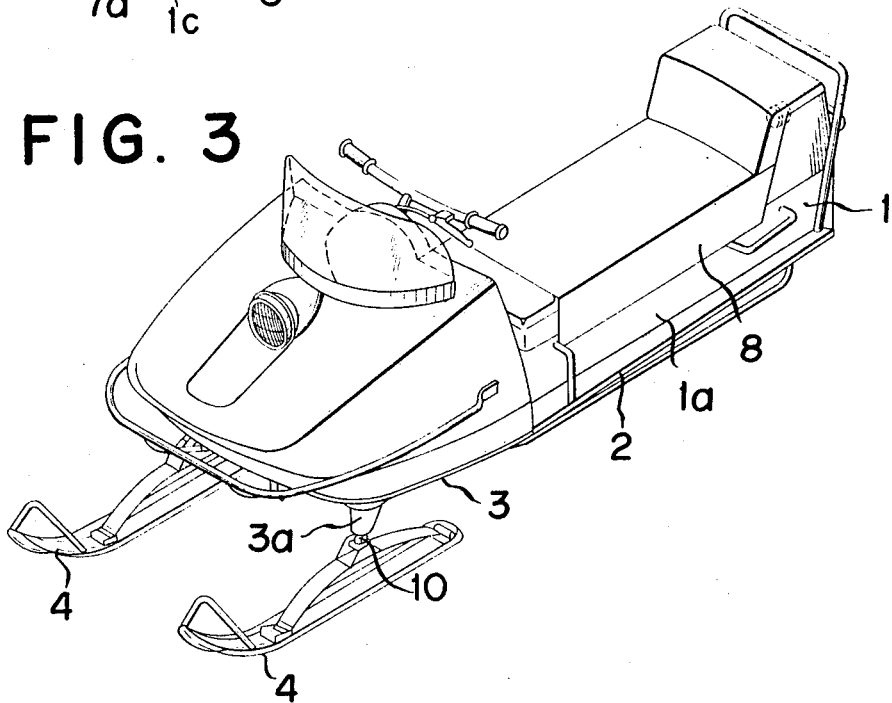
NORIO TAKADA
INVENTOR.

United States Patent Office 3,613,205
Patented Oct. 19, 1971

3,613,205
METHOD OF MAKING A FRAME ASSEMBLY OF AN ENDLESS-BELT TRACTION MIDGET SNOW VEHICLE
Norio Takada, Hamamatsu-shi, Japan, assignor to Yamaha Hatsudoki Kabushiki Kaisha, Hamakita-shi, Shizuoka-ken, Japan
Filed Mar. 25, 1969, Ser. No. 810,260
Claims priority, application Japan, Mar. 30, 1968, 43/20,661
Int. Cl. B23p *17/00, 19/00*
U.S. Cl. 29—155
6 Claims

ABSTRACT OF THE DISCLOSURE

A vehicle frame assembly consists of an inverted channel-shaped plate having stepped strips formed along the flanges, a pair of foot step plates welded to the stepped strips of the inverted channel-shaped plate in a manner to extend along the free edge of the flange of said channeled plate, and a front bottom plate for supporting a pair of a skis which is welded to the front bottom of said channeled plate. The plates are assembled after complementary parts are attached to any one or ones of said plates.

BACKGROUND OF THE INVENTION

This invention relates to a method of making a frame assembly of an endless-belt traction vehicle mainly used on the snow.

The prior art snow vehicle frame consisted of an inverted channel-shaped plate with a pair of foot steps and a front flange integrally formed with said plate, and a front bottom plate welded to the front bottom edge of said channeled plate and positioned at the lower side thereof. Since the channeled plate with the foot steps and front flanges was complicated in configuration, it had to be formed of a deep drawing process involving use of a capacious hydraulic pressure. Furthermore, the channeled plate with the foot steps and front flange was carried along the course of a continuous process of assembling minor parts thereto by the conveyor system, so that there were required a large working area and carriage so as to take care of the bulk and weight of said channeled plate. And the foot step portions, which were integrally formed with the channeled plate, often obstructed the operation of spot-welding complementary parts to the channeled plate.

SUMMARY OF THE INVENTION

An object of this invention is to provide a frame assembly of an endless-belt traction midget snow vehicle improved so as to be assembled with much improved productivity.

Therefore, the frame assembly of this invention comprises of an inverted channel-shaped plate, a pair of foot step plates welded to the sides of said inverted channel-shaped plate in a manner to extend along the free edge of the flange of said channeled plate, and a front bottom plate for supporting a pair of skis which is welded to the front bottom of said channeled plate.

A method for manufacturing said frame assembly comprises in forming a channeled plate by embossing and thereafter bending, forming each of a pair of foot step plates and a front bottom plate by deep drawing, and curling, and assembling said foot step plates and front bottom plate to said channeled plate by means of welding after complementary parts are attached to said channeled plate and, if required, to said foot step plates and front bottom plate.

BRIEF EXPLANATION OF THE DRAWINGS

This invention will be more fully understood from the following detailed description when taken in connection with reference to the accompanying drawings, in which:

FIG. 1 is a perspective view of a frame assembly embodying the invention, partly broken away;

FIG. 3 is a perspective view of a midget snow vehicle according to this invention.

DETAILED DESCRIPTION OF THE PREFERRED EMBODIMENTS

Figure 2:
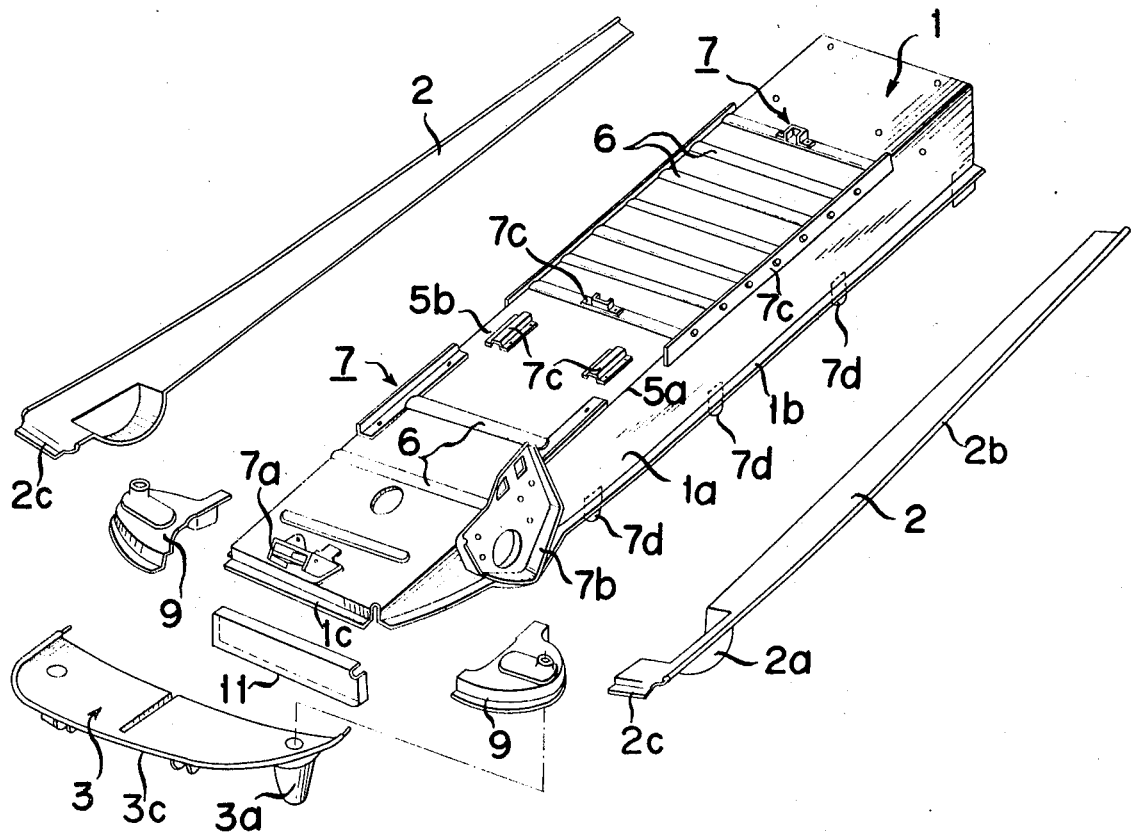
FIG. 2 is a dismembered perspective view of said frame assembly wherein main plates are not yet welded to each other.

A vehicle frame assembly of this invention is illustrated in FIG. 1. Said vehicle frame assembly consists of an inverted channel-shaped plate 1, a pair of foot step plates 2 welded to the sides of said channeled plate 1 in a manner to extend along the free edge of the flange 1a of said channeled plate 1, and a front bottom plate 3 for supporting a pair of skis 4 which is welded to the front bottom of said channeled plate. Said channeled plate is formed by bending a substantially flat plate along two parallel lines 5a and 5b. Said bending process may be accomplished so that the flat plate to be bent may be pressed between a narrow and long V-grooved die and a V-shaped punch fitting with said die. Said bending process is called a clamp-pressing. Said flat plate may be a trimmed blank plate previously provided with a plurality of convex portion 6, or corrugated for reinforcing the channeled plate 1 by means of an embossing process specifically designated for this purpose. As a result of said process, the finally channeled plate has stepped strips 1b and a stepped strip 1c formed at the edge of the flat plate. Said strip 1b is integrally formed with the free edge of the flange 1a to be welded to the foot step plate 2, and deflected to the line 5a or 5b with its parts positioned near the front end. Before the foot step plates 2 and the front bottom plate 3 are attached to the channeled plate 1 by welding, said channeled plate 1 is equipped with complementary parts 7 for attaching a seat 8, chain housing and other members thereto, said complementary parts 7 being preferably attached to the channeled plate 1 by being welded or riveted. As further detailed, there are provided an attaching member 7a for a steering column, a bracket 7b for bearing a chain housing, members 7c for attaching a seat 8 to the upper portion of the frame, brackets 7d for bearing the pivot axles of suspension wheels, and a panel 11 for reinforcing the front portion of the vehicle frame assembly. Each of the foot step plates 2 is formed of deep drawing process and provided with a deep drawn portion 2a for covering the bearings of a driving axle of a transmission device. The front bottom plate 3 is formed of deep drawing process and provided with a pair of cup-shaped lower members 3a for supporting ski columns 10 which are attached to the bottom thereof. The outer edge 2b of each of the foot step plates 2 and the outer edge 3c of the front bottom plate 3 are respectively curled by curling process. The foot step plates 2 are spot-welded to the strips 1b of the channeled plate 1 at the side portions.

The front bottom plate 3 is spot-welded to the front portions of the strips 1b and the stepped strip 1c of the channeled plate 1 as well as to the front edges of the foot step plates 2. Said vehicle frame assembly is provided with a pair of upper members 9 for supporting ski columns 10 welded to the channeled plate 1 and the front bottom plate.

Since the channeled plate 1, foot step plates 2 and front bottom panel 3 are separately formed, the minor parts can be spot-welded to the channeled plate 1, and the channeled plate 1 only can be carried along the course of a continuous process of assembling minor parts thereto. Furthermore, the channeled plate 1 is easily formed of that plate by simply bending because of its simple configuration without foot steps. At the final stage, the channeled plate 1, foot step plates 2 and front bottom plate 3 are assembled after attaching the complementary parts thereto, by spot-welding. Then the members 9 for supporting ski columns 10 are finally arc-welded to the channeled plate 1 and spot-welded to the front bottom plate 3. Accordingly, when compared with the prior art vehicle frame assembly, the frame assembly of this invention can be formed and assembled with much improved productivity.

What is claimed is:

1. A method of constructing a frame assembly of an endless-belt traction midget snow vehicle comprising the steps of:
    forming by bending an inverted channel-shaped plate (1) having a flange (1a) at each side thereof;
    forming stepped strips (1b) extending along at least a substantial portion of respective flanges (1a) of said channel-shaped plate (1);
    forming a pair of foot step plates (2) and a front bottom plate (3) by deep drawing;
    attaching complementary parts to at least said inverted channel-shaped plate (1); and
    thereafter welding said foot step plates (2) to respective stepped strips (1b) and welding said front bottom plate (3) to at least said channel-shaped plate (1) to form said frame assembly.

2. The method according to claim 1 comprising bending a trimmed blank plate having embossed convex portions (6) by a V-shaped punch and V-grooved die in forming said channel-shaped plate (1).

3. The method according to claim 1 wherein said step of attaching said complementary parts includes mounting an attaching member (7a) to said channel-shaped plate (1) for a steering column, mounting brackets (7b) to said channel-shaped plate for carrying a chain housing, attaching seat support members (7c) to the upper portion of said channel-shaped plate (1) and mounting brackets (7b) to said channel-shaped plate (1) to for bearing pivoted axles of suspension wheels.

4. The method according to claim 1 comprising welding a pair of upper members (9) for supporting ski columns (10) to said channel-shaped plate (1) after said plate (1) and said front bottom plate (3) are welded together.

5. The method according to claim 1 wherein said stepped strips (1b) are formed by curling prior to assembly of said frame assembly.

6. The method according to claim 1 wherein said front bottom plate (3) includes bent edges (3c) formed by curling prior to assembly of said frame assembly.

References Cited

UNITED STATES PATENTS

| | | | |
|---|---|---|---|
| 2,861,642 | 11/1958 | Hacker | 305—27 X |
| 3,530,950 | 9/1970 | Lamb | 180—5 |
| 1,547,591 | 7/1925 | Lambert | 280—163 |
| 3,309,150 | 3/1967 | Marier | 180—5 X |
| 3,435,907 | 4/1969 | Imhoff | 180—5 |

OTHER REFERENCES

Ski-Doo '68, advertising brochure published by Bombardier Ltd., Quebec, Canada, received in Patent Office Aug. 1, 1967.

RICHARD J. JOHNSON, Primary Examiner

U.S. Cl. X.R.

29—430, 469; 180—5; 296—29